US008289128B2

(12) United States Patent

Hsieh

(10) Patent No.: US 8,289,128 B2
(45) Date of Patent: *Oct. 16, 2012

(54) MONITORING SYSTEM AND INPUT/OUTPUT DEVICE THEREOF

(75) Inventor: Ming-Chih Hsieh, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 463 days.

This patent is subject to a terminal disclaimer.

(21) Appl. No.: 12/641,230

(22) Filed: Dec. 17, 2009

(65) Prior Publication Data

US 2011/0102128 A1 May 5, 2011

(30) Foreign Application Priority Data

Oct. 30, 2009 (CN) .......................... 2009 1 0309137

(51) Int. Cl.
*G05B 23/02* (2006.01)

(52) U.S. Cl. ................... 340/3.1; 340/425.5; 340/426.1; 340/426.16; 340/426.24; 340/426.25; 340/501; 340/506; 340/521; 340/522; 340/541; 340/568.1; 340/573.1; 340/539.22

(58) Field of Classification Search ................... 340/3.1, 340/425.5, 426.16, 426.25, 426.1, 426.24, 340/501, 506, 521, 522, 541, 568.1, 573.1, 340/539.22
See application file for complete search history.

(56) References Cited

U.S. PATENT DOCUMENTS 3,688,293 A * 8/1972 Sullivan ........................ 340/530
4,195,286 A * 3/1980 Galvin .......................... 340/501
4,356,476 A * 10/1982 Healey et al. ................. 340/522
4,980,292 A * 12/1990 Elbert et al. ..................... 422/63
5,319,698 A * 6/1994 Glidewell et al. ............... 379/39
5,534,845 A * 7/1996 Issa et al. ................... 340/425.5
5,539,157 A * 7/1996 Kobayashi et al. ............. 177/50
5,652,566 A * 7/1997 Lambert ........................ 340/507
5,736,927 A * 4/1998 Stebbins et al. .............. 340/506
5,783,989 A * 7/1998 Issa et al. ................. 340/426.25
5,874,889 A * 2/1999 Higdon et al. ........... 340/426.36
5,889,468 A * 3/1999 Banga ........................... 340/628
5,900,806 A * 5/1999 Issa et al. ................. 340/426.25
5,918,180 A * 6/1999 Dimino ....................... 455/456.3
6,054,920 A * 4/2000 Smith et al. ................... 340/506
6,119,147 A * 9/2000 Toomey et al. ............... 709/204
6,215,405 B1 * 4/2001 Handley et al. ............... 340/584
6,897,774 B2 * 5/2005 Costa et al. ................... 340/522
7,382,249 B2 * 6/2008 Fancella ......................... 340/541
7,447,612 B2 * 11/2008 Keyes et al. .................. 702/188
7,576,649 B2 * 8/2009 Wu ............................ 340/568.1
(Continued)

*Primary Examiner* — George Bugg
*Assistant Examiner* — Paul Obiniyi
(74) *Attorney, Agent, or Firm* — Altis Law Group, Inc.

(57) ABSTRACT

A monitoring system includes a controller, a plurality of sensors, a plurality of alarms, and a plurality of input/output devices. Each input/output device is connected between the controller and a sensor or an alarm. Each input/output device includes an input circuit, an output circuit, and a connector. The input circuit and the output circuit are connected between the controller and the connector. The connector is further selectively connected to a sensor or an alarm and a DC power in series. The controller controls a status of the input circuit and the output circuit. When the connector is connected to the alarm, the input circuit does not operate. The controller outputs a motion signal to the alarm via the output circuit. When the connector is connected to the sensor, the output circuit does not operate. The sensor outputs a detection signal to the controller via the input circuit.

8 Claims, 4 Drawing Sheets

U.S. PATENT DOCUMENTS

| | | | | |
|---|---|---|---|---|
| 7,688,212 | B2 * | 3/2010 | Farley | 340/573.1 |
| 7,756,293 | B2 * | 7/2010 | Kuwabara et al. | 382/103 |
| 7,940,177 | B2 * | 5/2011 | Krill | 340/545.3 |
| 7,970,919 | B1 * | 6/2011 | Duran | 709/230 |
| 2003/0128125 | A1 * | 7/2003 | Burbank et al. | 340/605 |
| 2003/0128126 | A1 * | 7/2003 | Burbank et al. | 340/605 |
| 2004/0222884 | A1 * | 11/2004 | Costa et al. | 340/522 |
| 2006/0139160 | A1 * | 6/2006 | Lin et al. | 340/506 |
| 2007/0046462 | A1 * | 3/2007 | Fancella | 340/541 |
| 2008/0042809 | A1 * | 2/2008 | Watts et al. | 340/426.16 |
| 2010/0045457 | A1 * | 2/2010 | Krill | 340/539.22 |
| 2011/0148565 | A1 * | 6/2011 | Hsieh | 340/3.1 |
| 2011/0175446 | A1 * | 7/2011 | Hsieh | 307/31 |
| 2011/0175720 | A1 * | 7/2011 | Hsieh | 340/509 |
| 2011/0175721 | A1 * | 7/2011 | Hsieh | 340/521 |

* cited by examiner

MONITORING SYSTEM AND INPUT/OUTPUT DEVICE THEREOF

BACKGROUND

1. Technical Field

The present disclosure relates to a monitoring system and, particularly, to a monitoring system with output/input devices.

2. Description of Related Art

In a monitoring system, which can also be called an alarm system, an input device is for inputting a detection signal from a sensor to a controller. An output device is for outputting a motion signal from the controller to an alarm. Generally, input devices and output devices are separately designed into the monitoring system and the number of input and output devices will be fixed. As a result, it is non-convenient to modify such a monitoring system to extend its input and output capability.

DETAILED DESCRIPTION

Figure 1:
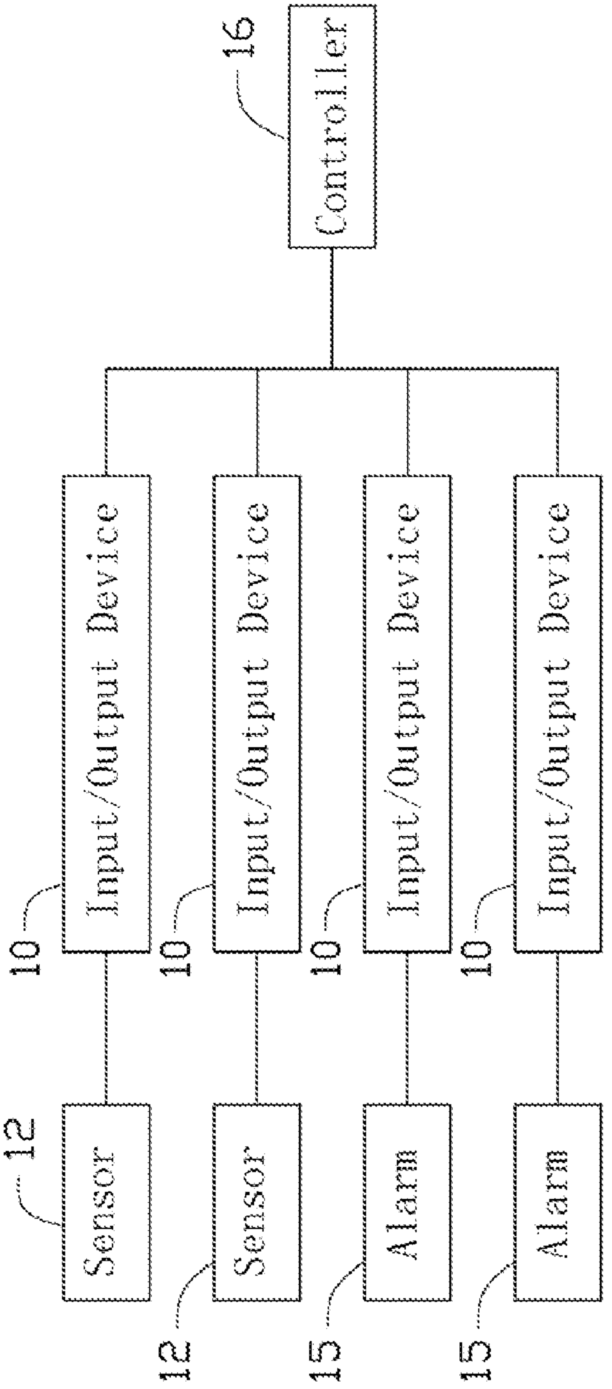
FIG. 1 is a schematic block diagram of an exemplary embodiment of a monitoring system, the monitoring system including input/output devices.

Referring to FIG. 1, an exemplary embodiment of a monitoring system 1 includes a plurality of input/output devices 10, a plurality of sensors 12, a plurality of alarms 15, and a controller 16.

A first terminal of each input/output device 10 is connected to one of the plurality of sensors 12, or one of the plurality of alarms 15. Second terminals of the plurality of input/output devices 10 are connected to the controller 16. In the embodiment, the sensor 12 may be mounted on a door. When the door is open, the sensor 12 outputs a detection signal, and the controller 16 outputs a motion signal to activate the alarm 15.

When the input/output device 10 functions as an input device, the input/output device 10 transmits a detection signal from the sensor 12, which is connected to the input/output device 10 to the controller 16. When the input/output device 10 functions as an output device, the input/output device 10 transmits a motion signal from the controller 16 to the alarm 15 which is connected to the input/output device 10.

Figure 2:
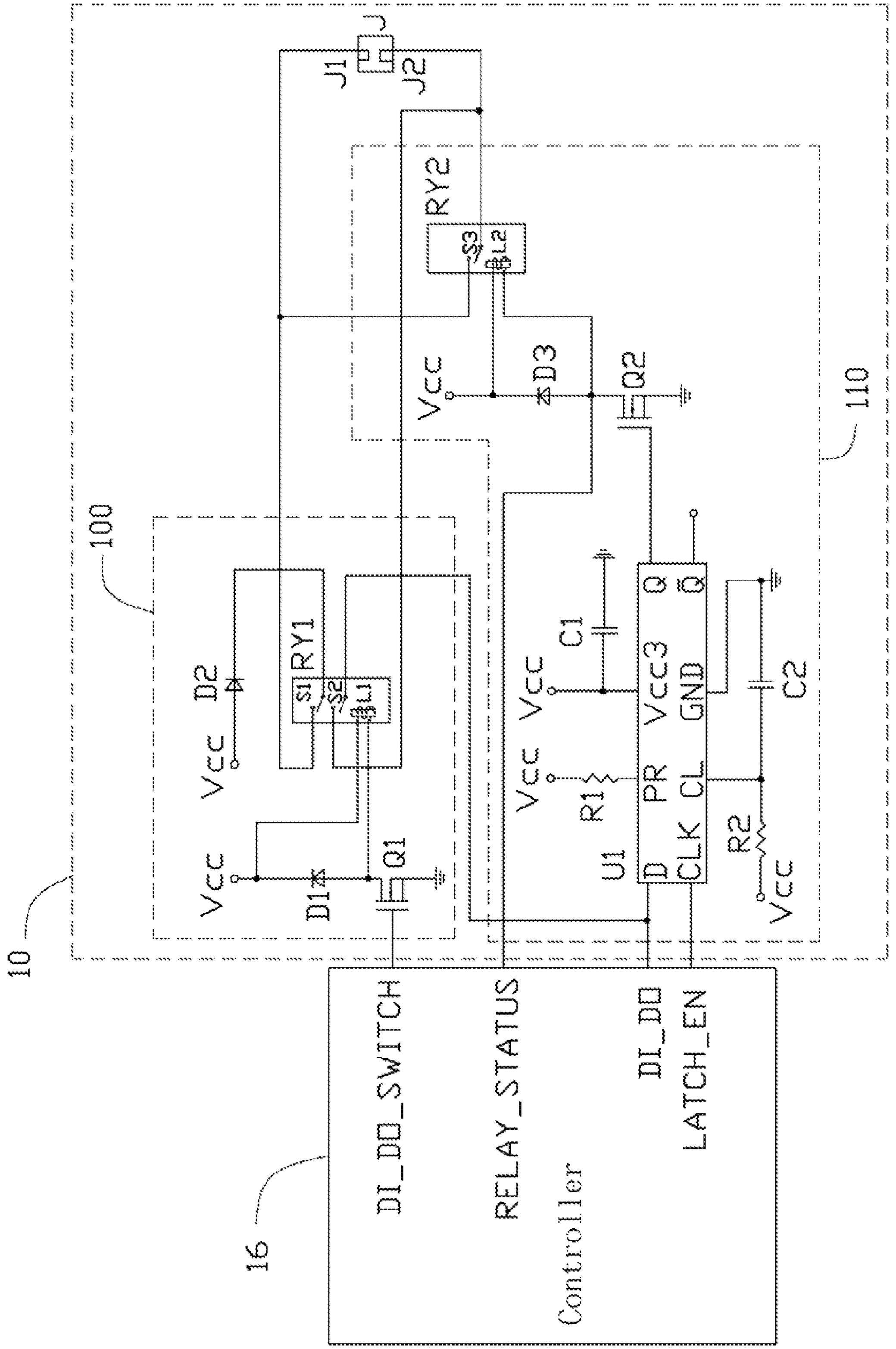
FIG. 2 is a circuit diagram of one of the input/output device in FIG. 1.

Referring to FIG. 2, the input/output device 10 includes an input circuit 100, an output circuit 110, and a connector J. The input circuit 100 is connected to the controller 16 and the connector J. The output circuit 110 is also connected to the controller 16 and the connector J.

The controller 16 controls status of the input circuit 100 and the output circuit 110. When the input circuit 100 is not in use, the controller 16 outputs a motion signal to the alarm 15 via the output circuit 110. When the output circuit 110 is not in use, the sensor 12 outputs a detection signal to the controller 16 via the input circuit 100.

The input circuit 100 includes a metal-oxide-semiconductor field effect transistor (MOSFET) Q1, two diodes D1 and D2, and a relay RY1. A gate of the MOSFET Q1 is connected to a control terminal DI_DO_SWITCH of the controller 16. A source of the MOSFET Q1 is grounded. A drain of the MOSFET Q1 is connected to an anode of the diode D1. A cathode of the diode D1 is connected to a power source Vcc.

The relay RY1 includes a coil L1 and two switches S1, S2. A first terminal of the coil L1 is connected to the power source Vcc. A second terminal of the coil L1 is connected to the drain of the MOSFET Q1. A first terminal of the switch S1 is connected to a first terminal J1 of the connector J. A second terminal of the switch S1 is connected to a cathode of the diode D2. An anode of the diode D2 is connected to the power source Vcc. A first terminal of the switch S2 is connected to a second terminal J2 of the connector J. A second terminal of the switch S2 is connected to an input/output terminal DI_DO of the controller 16.

The output circuit 110 includes a MOSFET Q2, a diode D3, a trigger U1, and a relay RY2. The relay RY2 includes a coil L2 and a switch S3.

A first terminal of the coil L2 is connected to the power source Vcc. A second terminal of the coil L2 is connected to a reading terminal RELAY_STATUS of the controller 16, and an anode of the diode D3. A cathode of the diode D3 is connected to the power source Vcc. The second terminal of coil L2 is further connected to the drain of the MOSFET Q2. A first terminal of the switch S3 is connected to the first terminal J1 of the connector J. A second terminal of the switch S3 is connected to the second terminal J2 of the connector J. A source of the MOSFET Q2 is grounded. A gate of the MOSFET Q2 is connected to a first terminal Q of the trigger U1.

A second terminal D of the trigger U1 is connected to the second terminal of the switch S2, and the input/output terminal DI_DO of the controller 16. A third terminal CLK of the trigger U1 is connected to a trigger terminal LATCH_EN of the controller 16. A fourth terminal PR of the trigger U1 is connected to the power source Vcc via a resistor R1. A fifth terminal Vcc3 of the trigger U1 is connected to the power source Vcc, and grounded via a capacitor C1. A sixth terminal $\overline{Q}$ of the trigger U1 is idle. A seventh terminal CL of the trigger U1 is connected to the power source Vcc via a resistor R2, and grounded via a capacitor C2. An eighth terminal GND of the trigger U1 is grounded. In the embodiment, the trigger U1 is a D type trigger. The MOSFETs Q1 and Q2 are n-type MOSFETs.

When the control terminal DI_DO_SWITCH of the controller 16 outputs a low level signal, the input circuit 100 does not operate, while the output circuit 110 is ready for use. At this time, the input/output terminal DI_DO of the controller 16 functions as an output terminal, to output a motion signal to the alarm 15, which is connected to the connector J.

When the control terminal DI_DO_SWITCH of the controller 16 outputs a high level signal, the input circuit 100 is ready for use, while the output circuit 110 does not operate. At this time, the input/output terminal DI_DO of the controller 16 functions as an input terminal, to receive a detection signal from the sensor 12, which is connected to the connector J.

Figure 3:
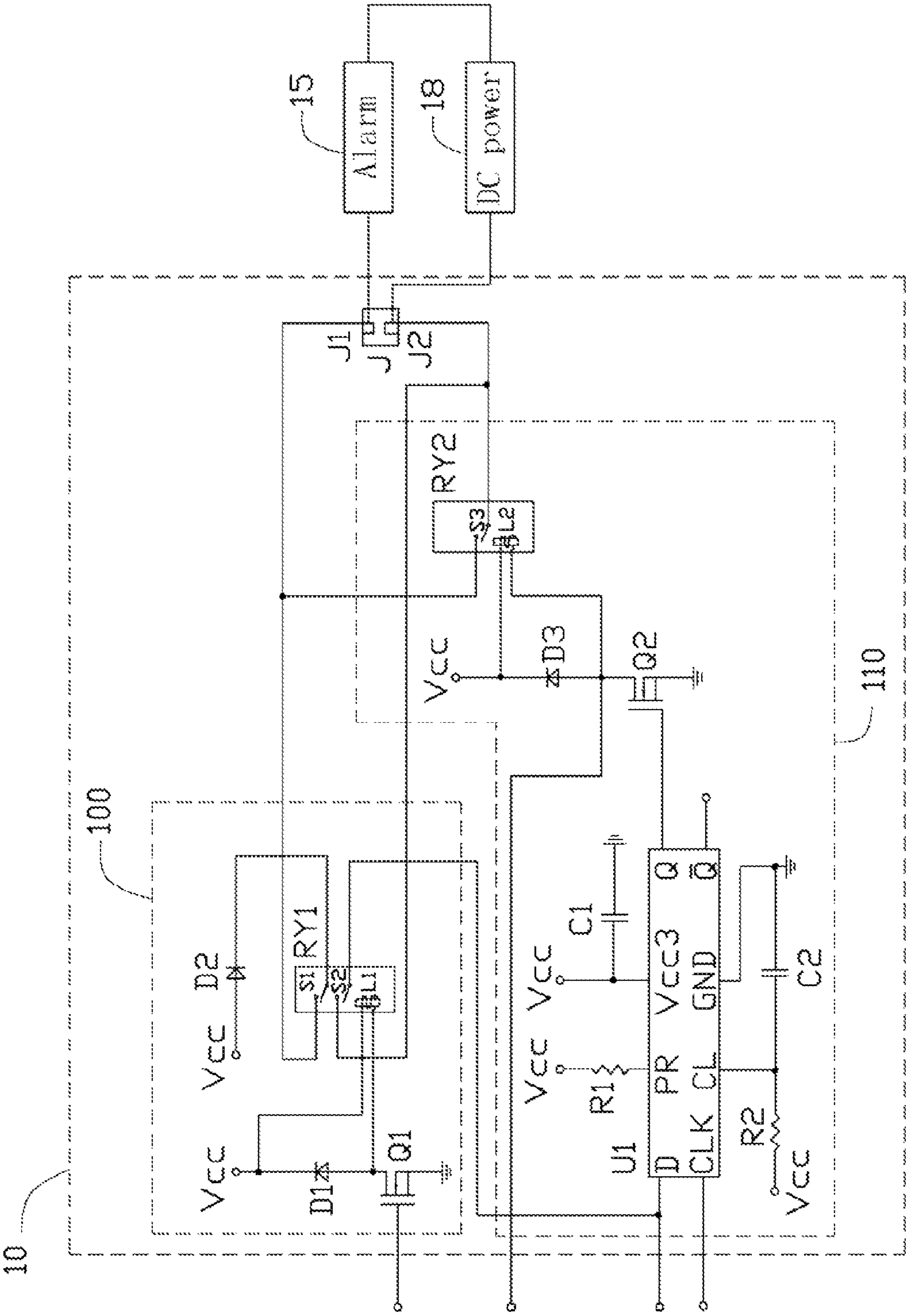
FIG. 3 is a schematic diagram of one of the input/output devices in FIG. 1 functioning as an output device.

Referring to FIG. 3, when the gate of the MOSFET Q1 is at a low level, the input/output device 10 functions as an output device. At this time, the first terminal J1 of the connector J, the alarm 15, a DC power, and the second terminal J2 of the connector J are connected in series.

When the control terminal DI_DO_SWITCH of the controller 16 is at a low level, the gate of the MOSFET Q1 is at a low level. The MOSFET Q1 turns off. The relay RY1 is non-actuated. At this time, the input circuit 100 does not operate. Upon the condition that the input/output terminal DI_DO of the controller 16 is at a high level, and the trigger terminal LATCH_EN of the controller 16 is at a rising edge, the second terminal D of the trigger U1 is at a high level, and the third terminal CLK of the trigger U1 is at a rising edge. As a result, the first terminal Q of the trigger U1 is at a high level. The MOSFET Q2 turns on. The relay RY2 is actuated. The switch S3 turns on. At this time, the alarm 15, the DC power 18, and the switch S3 form a closed loop. The alarm 15 works.

Upon the condition that the input/output terminal DI_DO of the controller 16 is at a low level, and the trigger terminal LATCH_EN of the controller 16 is at a rising edge, the second terminal D of the trigger U1 is at a low level, and the third terminal CLK of the trigger U1 is at a rising edge. As a result, the first terminal Q of the trigger U1 is at a low level. The MOSFET Q2 turns off. The relay RY2 is non-actuated. The switch S3 turns off. At this time, the alarm 15 is disconnected from the DC power 18. The alarm 15 stops operating.

Figure 4:
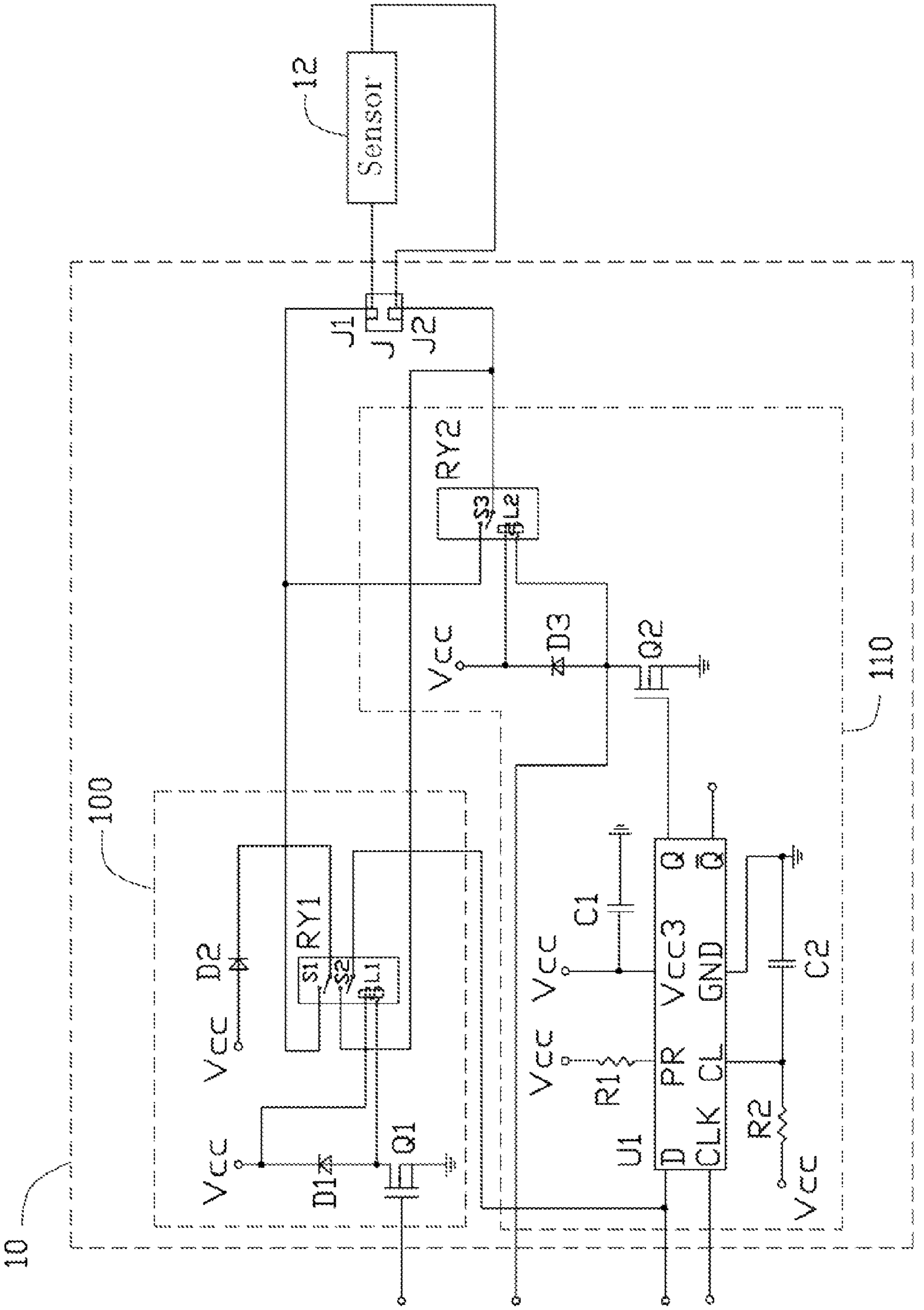
FIG. 4 is a schematic diagram of one of the input/output devices in FIG. 1 functioning as an input device.

Referring to FIG. 4, when the gate of the MOSFET Q1 is at a high level, the input/output device 10 functions as an input device. At this time, the first and second terminals J1, J2 of the connector J are connected to two terminals of the sensor 12 respectively. In the embodiment, the sensor 12 is a mounted on a door. When the door is open, the sensor 12 is turned off, and when the door is closed, the sensor 12 is turned on.

When the control terminal DI_DO_SWITCH of the controller 16 is at a high level, the gate of the MOSFET Q1 is at a high level. The MOSFET Q1 turns on. The relay RY1 is actuated. At this time, the input circuit 100 is in use. The trigger terminal LATCH_EN of the controller 16 is not at a rising edge. The third terminal CLK of the trigger U1 is not at a rising edge. As a result, the fifth terminal Q of the trigger U1 outputs no signal. The MOSFET Q2 turns off. The relay RY2 is non-actuated. The switch S3 turns off. At this time, the output circuit 110 does not operate.

When the door is open, the sensor 12 turns off. The power source Vcc is disconnected from the input/output terminal DI_DO of the controller 16. At this time, the input/output terminal DI_DO of the controller 16 is at a low level. As a result, the controller 16 determines that the door is open.

When the door is closed, the sensor 12 turns on. The power source Vcc is connected to the input/output terminal DI_DO of the controller 16 via the diode D2, the switch S1, the connector J, the sensor 12, and the switch S2 in series. At this time, the input/output terminal DI_DO of the controller 16 is at a high level. As a result, the controller 16 determines that the door is closed.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A monitoring system comprising a controller, a plurality of sensors, a plurality of alarms, and a plurality of input/output devices; wherein each input/output device is connected between the controller and one of the plurality of sensors or one of the plurality of alarms, each input/output device comprises an input circuit, an output circuit, and a connector, the input circuit and the output circuit are connected between the controller and the connector, the connector is further selectively connected to one of the plurality of sensors or one of the plurality of alarms and a DC power in series; and wherein the controller controls a status of the input circuit and the output circuit, upon the condition that the connector is connected to the alarm, the input circuit does not operate, the controller outputs a motion signal to the alarm via the output circuit; upon the condition that the connector is connected to the sensor, the output circuit does not operate, the sensor outputs a detection signal to the controller via the input circuit; wherein the input circuit comprises a first MOSFET, a first diode, a second diode, and a first relay, a gate of the first MOSFET is connected to a first terminal of the controller, a source of the first MOSFET is grounded, a drain of the first MOSFET is connected to an anode of the first diode, a cathode of the first diode is connected to a power source; wherein the first relay comprises a first coil, a first switch, and a second switch, a first terminal of the first coil is connected to the power source, a second terminal of the coil is connected to the drain of the MOSFET, a first terminal of the first switch is connected to a first terminal of the connector, a second terminal of the first switch is connected to a cathode of the second diode, an anode of the second diode is connected to the power source, a first terminal of the second switch is connected to a second terminal of the connector, a second terminal of the second switch is connected to a second terminal of the controller.

2. The monitoring system of claim 1, wherein the first MOSFET is an n-type MOSFET.

3. The monitoring system of claim 1, wherein the output circuit comprises a second MOSFET, a third diode, a second relay, and a trigger; wherein the second relay comprises a second coil and a third switch, a first terminal of the second coil is connected to the power source, a second terminal of the second coil is connected to a third terminal of the controller, an anode of the third diode, and a drain of the second MOSFET; a cathode of the third diode is connected to the power source, a first terminal of the third switch is connected to the first terminal of the connector, a second terminal of the third switch is connected to the second terminal of the connector; a source of the second MOSFET is grounded, a gate of the second MOSFET is connected to the first terminal of the trigger, a second terminal of the trigger is connected to the second terminal of the switch and the second terminal of the controller, a third terminal of the trigger is connected to a fourth terminal of the controller, a fourth terminal of the trigger is connected to the power source via a first resistor, a fifth terminal of the trigger is connected to the power source, and grounded via a first capacitor, a sixth terminal of the trigger is idle, a seventh terminal of the trigger is connected to the power via a second resistor, and grounded via a second capacitor, an eighth terminal of the trigger is grounded.

4. The monitoring system of claim 3, wherein the second MOSFET is an n-type MOSFET.

5. An input/output device comprising an input circuit, an output circuit, and a connector, wherein the input circuit and the output circuit are connected between a controller and the connector, the connector is further selectively connected to one of a plurality of sensors or one of a plurality of alarms and a DC power in series; and wherein the controller controls a status of the input circuit and the output circuit, upon the condition that the connector is connected to the alarm, the input circuit does not operate, the controller outputs a motion signal to the alarm via the output circuit; upon the condition that the connector is connected to the sensor, the output circuit does not operate, the sensor outputs a detection signal to the controller via the input circuit; wherein the input circuit comprises a first MOSFET, a first diode, a second diode, and a first relay, a gate of the first MOSFET is connected to a first terminal of the controller, a source of the first MOSFET is grounded, a drain of the first MOSFET is connected to an anode of the first diode, a cathode of the first diode is connected to a power source; wherein the first relay comprises a first coil, a first switch, and a second switch, a first terminal of the first coil is connected to the power source, a second terminal of the coil is connected to the drain of the MOSFET, a first terminal of the first switch is connected to a first terminal of the connector, a second terminal of the first switch is connected to a cathode of the second diode, an anode of the second diode is connected to the power source, a first terminal of the second switch is connected to a second terminal of the connector, a second terminal of the second switch is connected to a second terminal of the controller.

6. The input/output device of claim 5, wherein the first MOSFET is an n-type MOSFET.

7. The input/output device of claim 5, wherein the output circuit comprises a second MOSFET, a third diode, a second relay, and a trigger; wherein the second relay comprises a second coil and a third switch, a first terminal of the second coil is connected to the power source, a second terminal of the second coil is connected to a third terminal of the controller, an anode of the third diode, and a drain of the second MOSFET; a cathode of the third diode is connected to the power source, a first terminal of the third switch is connected to the first terminal of the connector, a second terminal of the third switch is connected to the second terminal of the connector; a source of the second MOSFET is grounded, a gate of the second MOSFET is connected to the first terminal of the trigger, a second terminal of the trigger is connected to the second terminal of the switch and the second terminal of the controller, a third terminal of the trigger is connected to a fourth terminal of the controller, a fourth terminal of the trigger is connected to the power source via a first resistor, a fifth terminal of the trigger is connected to the power source, and grounded via a first capacitor, a sixth terminal of the trigger is idle, a seventh terminal of the trigger is connected to the power via a second resistor, and grounded via a second capacitor, an eighth terminal of the trigger is grounded.

8. The input/output device of claim 7, wherein the second MOSFET is an n-type MOSFET.

* * * * *